May 29, 1962 A. G. BERWICK ETAL 3,036,820
APPARATUS FOR STORING AND DISPENSING MILK
AND SIMILAR BEVERAGES
Filed May 17, 1958 2 Sheets-Sheet 1
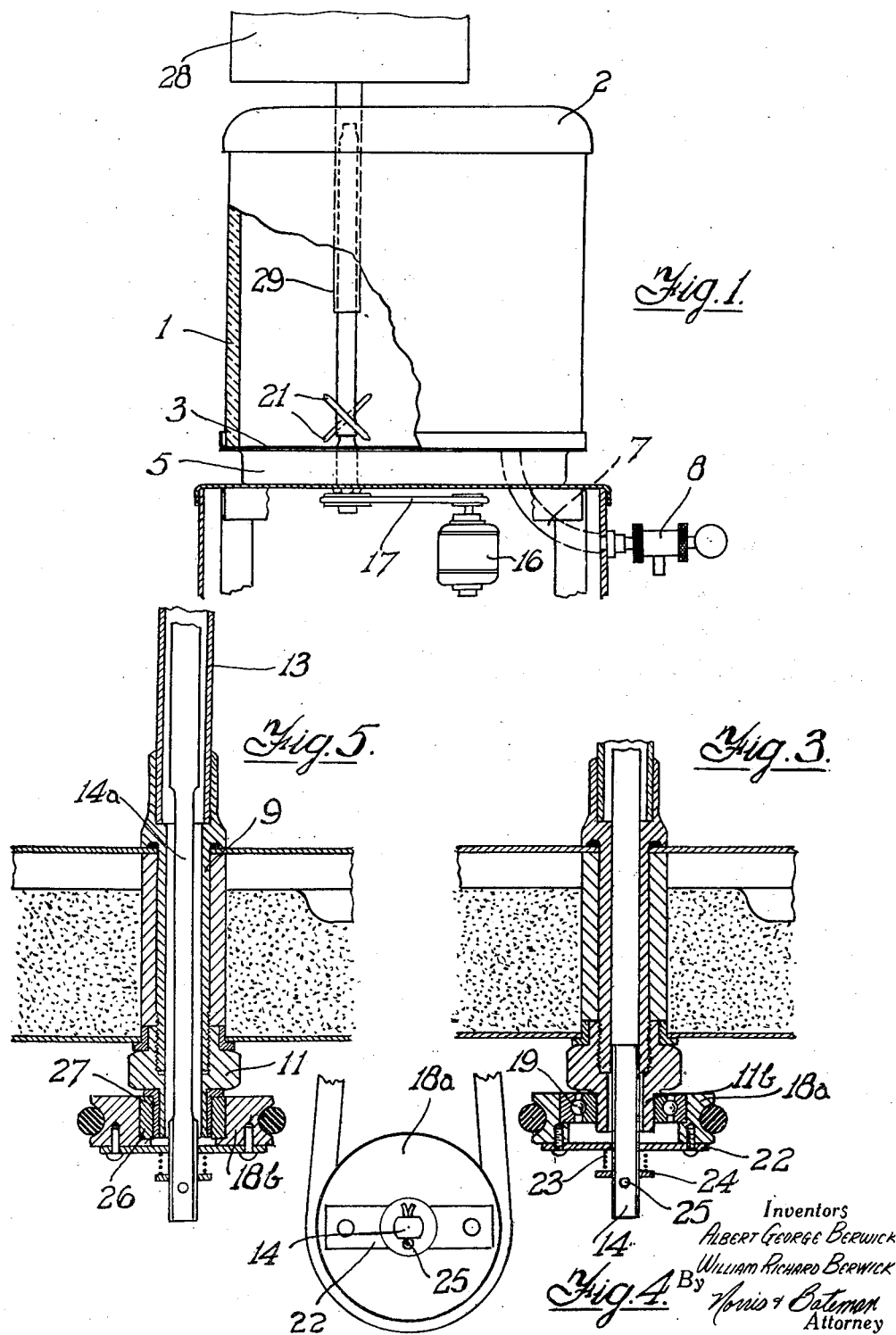
Inventors
ALBERT GEORGE BERWICK
WILLIAM RICHARD BERWICK
By Norris & Bateman
Attorney

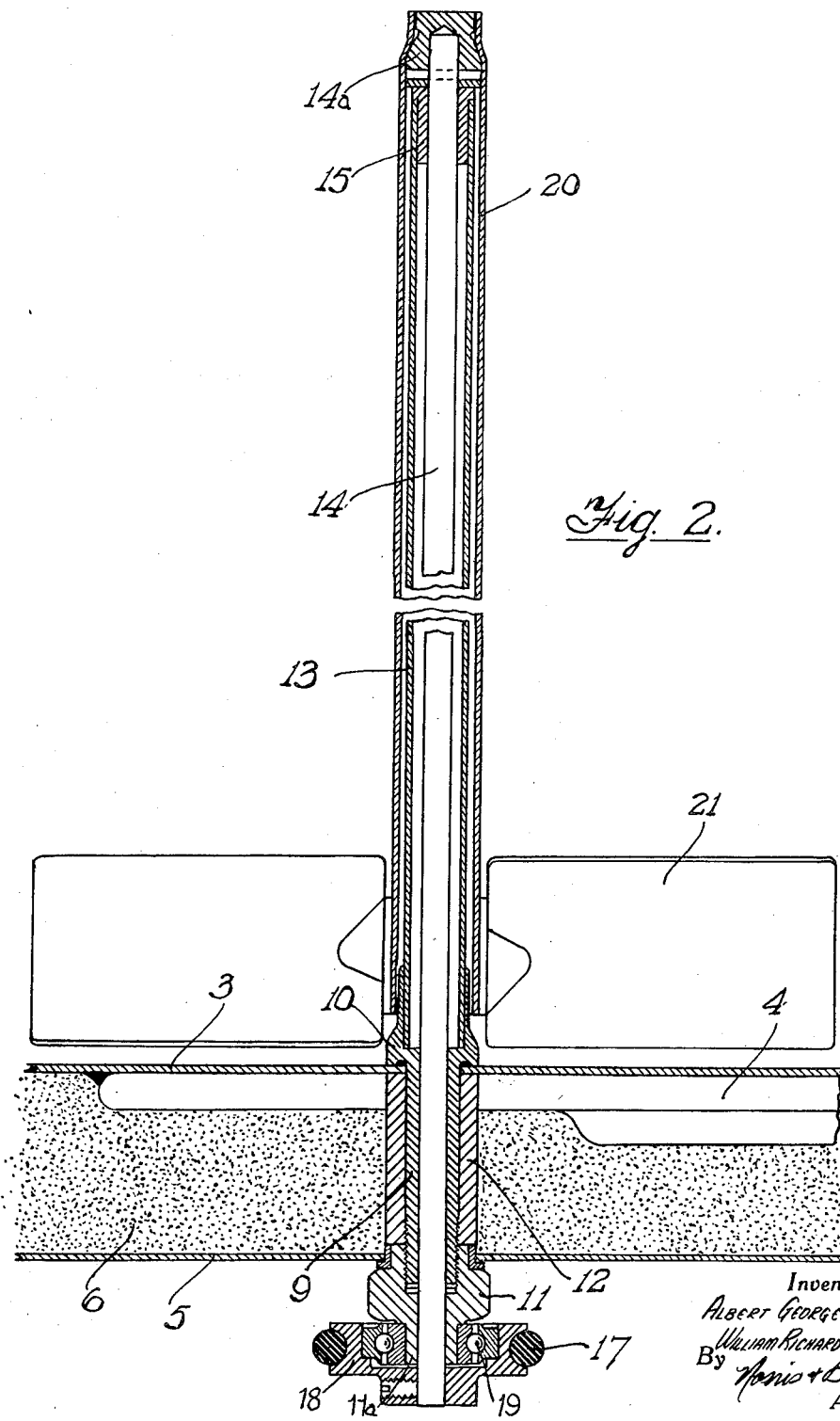

United States Patent Office 3,036,820
Patented May 29, 1962

3,036,820
APPARATUS FOR STORING AND DISPENSING MILK AND SIMILAR BEVERAGES
Albert George Berwick and William Richard Berwick, Croydon, England, assignors to Gaskell & Chambers Limited
Filed Nov. 17, 1958, Ser. No. 774,540
Claims priority, application Great Britain Nov. 20, 1957
7 Claims. (Cl. 259—43)

This invention relates to apparatus for storing and dispensing cooled milk, chilled water and similar relatively cold beverages or other liquids and particularly to apparatus of the kind comprising a bowl or vessel for storing the liquid to be dispensed, means for cooling the liquid, means for agitating the liquid within the bowl to prevent separation of solid matter and to ensure that an even temperature is maintained throughout the body of liquid, and a tap or equivalent means for drawing off liquid as and when desired.

In prior apparatus of this type agitation of the liquid is maintained by a pump which withdraws liquid from the bowl and returns it thereto in such manner as to set up a rotary motion of the liquid within the bowl. Such vigorous agitation, however, could not be used with liquids such as milk as it would cause agglomeration of the fatty particles into butter, and it is an object of the present invention to provide an improved and simplified form of the apparatus above mentioned which will adapt it for use in dispensing milk and similar liquids.

A more specific object of the invention is to provide a dispensing apparatus having the features defined above and embodying paddle-type agitating means which will maintain an adequate circulation of the body of liquid without vigorous agitation and in which the apparatus can be readily dismantled for cleaning and as easily reassembled without any risk of the liquid coming into contact with the agitator driving gear.

According to one aspect of the invention the improved apparatus comprises a bowl or like liquid container, means for cooling the liquid within the bowl, a paddle-type agitator supported within the bowl and having its blades or vanes so disposed that it creates a circulation of liquid in a general path which includes upward and downward flow at different zones within the bowl and a tap or equivalent means for drawing off liquid from the bowl. Thus with the agitator in use, the upper surface portion of the body of liquid is constantly being drawn downwards while liquid at the bottom of the bowl is similarly forced upwards thus preventing any separation of solid material at the surface or the bottom of the liquid.

According to another aspect of the invention the improved apparatus comprises a bowl or like liquid container, means for cooling the liquid within the bowl, a paddle-type agitator for maintaining a circulation of liquid within the bowl and supported upon a driving spindle extending upwardly through the base of the bowl, a tubular casing enclosing said spindle, closure means for the upper end of said casing, spring means urging a shoulder or abutment on the driving spindle into sealing engagement with said closure means, and a tap or equivalent means for drawing off liquid from the bowl.

Reference will now be made to the accompanying drawings which illustrate several embodiments of the invention and wherein FIG. 1 is a side elevation of the improved dispensing apparatus, FIG. 2 is an axial section through the agitator supporting and driving means, FIG. 3 is a fragmentary section through an alternative form of agitator driving means, FIG. 4 is an inverted plan of FIG. 3, and FIG. 5 is a view similar to FIG. 3 but showing alternative bearing means.

Referring first to FIGS. 1 and 2, the apparatus shown comprises a cylindrical bowl 1 of transparent material closed at its upper end by a removable cover 2 and at its lower end by a stainless steel base plate 3, a refrigerator-type cooling unit of which the evaporator 4 is located in close contact with the underside of said plate and within a tray 5 packed with insulating material 6, and a discharge passage 7 extending downwardly through the base plate to a cock, tap or like draw-off device 8.

To support the agitator and its driving means there is provided a guide sleeve 9 extending vertically and with close fit through an aperture in the base plate 3, said sleeve being formed near its upper end with a lateral flange or shoulder 10 adapted to bear upon the upper surface of the base plate with the interposition of a sealing washer and being screw-threaded at its lower end to receive a retaining nut 11. The lower portion of the guide sleeve is enclosed by a thrust sleeve 12 which bears at its ends against the nut 11 and the underside of base plate 3 respectively such that when the nut is tightened the guide sleeve is firmly clamped to the base plate. Alternatively, the guide sleeve may be permanently fixed at its upper end to the base plate, for example by welding, in which case the thrust sleeve would be dispensed with but the nut 11 or its equivalent would be retained to provide a support for a drive pulley hereinafter described. Fixed to the guide sleeve and extending upwardly within the bowl is a tubular casing 13 enclosing a driving spindle 14 which at its lower end passes down through the guide sleeve and the retaining nut, a flanged bushing 15 being fitted into the upper end of casing 13 to act as a guide or bearing for the driving spindle and also a seating for a head or enlargement 14a riveted to the upper end of the driving spindle. The bushing is formed of a plastic bearing material which is impervious to the liquid being dispensed and which will seal the tubular casing against ingress of liquid at this point while providing a silent smooth-running bearing for the driving spindle, the guide sleeve providing the necessary bearing for the lower end portion of the spindle.

The spindle 14 is adapted to be driven by a small electric motor 16 through a belt 17 and a pulley or driving member 18 having driving connection with the lower end of said spindle, but to avoid imposing lateral strain on the spindle the pulley is rotatably supported by means of a ball race 19 on an extension 11a of the retaining nut. The belt and pulley system may be substituted by a chain and sprocket or spur gearing if desired.

The agitator device consists of a tubular support 20 having a reduced upper end and carrying near its lower end a pair of diametrically-opposed inclined blades 21, the internal diameter of the support being such that it can be slid over the tubular casing 13 into a position in which it seats at its upper end on the head 14a of the driving spindle. The spindle head 14a is of square or other non-circular cross section, the upper end of the support 20 being correspondingly shaped, so that a driving connection with the spindle is established whilst permitting easy removal and cleaning of the agitator when desired. The inclination of the blades is about 45° to the vertical axis of the spindle and downwardly inclined with respect to the direction of rotation of the spindle as shown in FIGURE 1 so that upon relatively slow rotation of the agitator a gentle downward current of liquid is established at that side of the bowl, the liquid thereafter flowing across the bottom of the bowl, rising at the opposite side and then back towards the region of the agitator, although the rotation of the blades also creates a degree of rotary motion of liquid within the bowl. Thus any tendency of solid matter in the liquid to separate out at the surface of the liquid or at the bottom of the bowl is prevented while at the same time the constant flow of liquid over the cooled base plate ensures an even low temperature being maintained throughout the body of liquid.

With the construction above described, there is a risk of condensation forming in the space between the driving spindle and the casing 13 and draining through the retaining nut into the pulley structure from which point it could find its way into the bearing so reducing the efficiency of the bearing or even rendering it inoperative. FIGS. 3 and 4 show a construction which avoids the possibility of the bearing becoming impaired in this manner. As shown, the bearing 19 is located above the lower end of the extension 11b, the spindle 14 passing with clearance through the retaining nut and its extension and the pulley or driving member 18a having a central opening extending completely therethrough so that any liquid draining through the nut falls away clear of the bearing. FIG. 5 shows an alternative spindle construction in which a portion 14a thereof towards its lower end is of reduced cross section so providing increased clearance between said spindle on the one part and the retaining nut 11, guide sleeve 9 and the lower end of casing 13 on the other part. This increased clearance encourages drainage of any liquid collecting in casing 13 without the risk of any deleterious effect on the bearing.

To transmit drive from the pulley to the spindle, a driving plate 22 extends diametrically across the underside of the pulley and is riveted or otherwise fixed thereto, said plate being apertured at its centre for the passage of the spindle. The lower end of the spindle has one or more flats formed thereon and the aperture in the driving plate is correspondingly shaped so that the spindle can slide freely through the plate but is driven thereby.

Encircling the lower end of the driving spindle is a coiled compression spring 23 which bears at its upper end against the underside of the driving plate 22 and at its lower end against a washer 24 located by a split pin 25 or like removable abutment on the spindle. Thus the spring exerts a downward thrust upon the spindle and maintains the head on the upper end of said spindle in close engagement with the sealing bush to prevent entry of liquid into the tubular casing at this point. Moreover, this arrangement provides accurate support and location of the driving spindle without the necessity of manufacturing to fine tolerances, it ensures that liquid cannot leak into the pulley bearing and it permits rapid and easy dismantling of the driving gear should this be necessary for cleaning or other purposes.

Instead of the ball bearing 19 or an equivalent roller bearing, a journal type bearing may be used as shown in FIG. 5. In this construction, the pulley 18b is fitted with a sleeve or liner 26 formed of a suitable plastic bearing material, or of Phosphor bronze or other self-lubricating bearing metal or of carbon, the extension on the retaining nut being preferably fitted with a stainless steel collar 27 to receive the pulley and the pulley being retained thereon by means similar to that described with reference to FIGS. 3 and 4.

The provision of a rotary agitator mounted in the manner described provides ready means for actuating a rotary sign or other animated display device. By way of example there is shown in FIG. 1 a rotary drum or like structure 28 adapted to bear advertising or other display matter and carried on the upper end of a supporting sleeve 29 which extends downwardly through a hole in the lid of the bowl and has a frictional fit on the tubular support 20 of the agitator such that it can be readily removed to provide access to the bowl.

While the improved apparatus is particularly suitable for dispensing cooled milk it will be understood that it can be used advantageously for dispensing chilled water and other liquids where it is desired to maintain an even low temperature throughout the body of stored liquid.

We claim:

1. Apparatus for storing and dispensing liquid beverages, comprising a liquid container having an internal side wall continuously curved about a vertical axis and intersecting at its lower end, an internal bottom surface contacting the liquid and means for cooling said surface, a paddle-type agitator for maintaining a circulation of liquid within the container and supported upon a vertical driving spindle extending upwardly through the base of the container, means mounting said spindle in laterally displaced relation with respect to said vertical axis of the container and adjacent a side wall portion, an agitator driven by said spindle and carrying blades disposed adjacent said bottom surface and inclined with respect to the vertical axis of said spindle and downwardly with respect to the axis of rotation of said spindle, the direction of rotation of said agitator being such as to produce a generally transverse circulation of liquid in said container in substantially an elliptical path during which liquid at said adjacent side wall portion is drawn downwardly and then across said cooled bottom surface, a fixed tubular casing within the container enclosing said spindle, closure means for the upper end of said casing, said spindle extending through said closure means, a shoulder on the driving spindle, spring means urging said shoulder into sealing engagement with said closure means, and a tap for drawing off liquid from the container.

2. Apparatus as claimed in claim 1, wherein said closure means consists of a bushing fitted into the upper end of the tubular casing and also constituting a guide and bearing for the driving spindle, and said spindle is fitted with a head at its upper end and is spring-loaded in a downward direction by said spring means to hold said head in sealing engagement with said bushing.

3. Apparatus as claimed in claim 2, wherein the agitator comprises a tubular support mounted concentrically of the driving spindle in surrounding relation to said casing and carrying said inclined blades, and the upper end of said support having a detachable connection to the head on the driving spindle.

4. Apparatus for storing and dispensing liquid beverages, comprising a liquid container, a paddle-type agitator for maintaining a circulation of liquid within the container and supported upon a vertical driving spindle extending upwardly through the base of the container, a fixed tubular casing within the container enclosing said spindle, closure means for the upper end of said casing, said spindle extending through said closure means, a shoulder on the driving spindle, spring means urging said shoulder into sealing engagement with said closure means, a guide sleeve extending with a sealing fit through the base of the container and carrying said tubular casing at its upper end, a retaining nut screw-threaded onto the lower end of said sleeve below the container, a driving member rotatably supported on said nut, a driving connection between the nut and the lower end of the spindle, and a tap for drawing off liquid from the container.

5. Apparatus as claimed in claim 4, wherein the driving spindle extends with clearance through the retaining nut and the pulley such that any liquid collecting within the tubular casing can drain away from said rotatable support of the driving member.

6. Apparatus for storing and dispensing liquid beverages, comprising a liquid container, a paddle-type agitator for maintaining a circulation of liquid within the container and supported upon a vertical driving spindle extending upwardly through the base of the container, a fixed tubular casing within the container enclosing said spindle, closure means for the upper end of said casing, said spindle extending through said closure means, a shoulder on the driving spindle, spring means urging said shoulder into sealing engagement with said closure means, said closure means consisting of a bushing fitted into the upper end of the tubular casing and also constituting a guide and bearing for the driving spindle, a head on said spindle at its upper end, means spring-loading said spindle in a downward direction by said spring means to hold said head in sealing engagement with said bushing, a rotatable driving member for said spindle, a driving connection between said driving member and the spindle comprising a plate secured to the driving member and having a sliding but non-rotatable connection with the spindle, and said spring loading means comprising a spring interposed between said plate and an abutment on the spindle to urge said spindle downwardly and hold the head on the upper end thereof in sealing engagement with the bushing in the upper end of the tubular casing.

7. Apparatus for storing and dispensing liquid beverages comprising a liquid container embodying a base plate, a paddle-type agitator within the container supported for rotation upon a vertical driving spindle offset towards one side of the container and extending through the base of the container, said agitator including inclined blades adapted to create a downward flow of liquid at that side of the container and a circulation around the container, a driving member connecting to the lower end of said spindle, a casing enclosing the upper portion of said spindle within the container, a spring acting on said spindle to urge a surface thereon into sealing engagement with the upper end of said casing, passage means extending through said base plate and clear of the driving member for draining condensation from the interior of said casing, and a tap for drawing off liquid from the container.

References Cited in the file of this patent

UNITED STATES PATENTS

| | | |
|---|---|---|
| 1,925,120 | Tamminga | Sept. 5, 1933 |
| 1,978,689 | Peters | Oct. 30, 1934 |
| 2,121,299 | Peters | June 21, 1938 |
| 2,414,521 | Gunther | Jan. 21, 1947 |
| 2,455,177 | Irish | Nov. 30, 1948 |
| 2,774,576 | Frank | Dec. 18, 1956 |
| 2,778,202 | Fischer et al. | Jan. 22, 1957 |
| 2,828,950 | Stilwell | Apr. 1, 1958 |